United States Patent [19]

Graham

[11] Patent Number: 5,163,757
[45] Date of Patent: Nov. 17, 1992

[54] METAL OXIDE LUBRICATION FOR CERAMIC BEARING SYSTEM

[75] Inventor: Edgar E. Graham, Lyndhurst, Ohio

[73] Assignee: Cleveland State University, Cleveland, Ohio

[21] Appl. No.: 739,402

[22] Filed: Aug. 2, 1991

[51] Int. Cl.$^5$ ............................................. F16C 33/44
[52] U.S. Cl. ..................................... 384/463; 384/492; 384/912
[58] Field of Search ............... 384/463, 470, 492, 527, 384/912, 913, 907.1

[56] References Cited

U.S. PATENT DOCUMENTS

| | | | |
|---|---|---|---|
| 4,797,011 | 1/1989 | Saeki et al. | 384/463 |
| 4,871,266 | 10/1989 | Oda | 384/463 |
| 4,934,837 | 6/1990 | Kawamura | 384/492 |
| 4,997,296 | 3/1991 | Narita et al. | 384/492 |

Primary Examiner—Lenard A. Footland
Attorney, Agent, or Firm—John F. McDevitt

[57] ABSTRACT

Ceramic bearing means being operated at elevated temperatures under atmospheric conditions are lubricated with metal oxide products. The lubricants are formed in situ by continuously oxidizing a metal source located in physical proximity to the ceramic bearing surfaces during operation of such bearing means.

19 Claims, 2 Drawing Sheets

METAL OXIDE LUBRICATION FOR CERAMIC BEARING SYSTEM

BACKGROUND OF THE INVENTION

This invention relates generally to a lubrication system enabling ceramic bearing means to resist mechanical wear at elevated temperatures up to 600° C. and higher, and more particularly to continuously supplying metal oxide lubricants during bearing operation as the means for doing so.

Lubrication is a well recognized means to reduce friction and wear between bearing surfaces in dynamic physical contact. Two major areas for which improved lubricants are needed for continued progress are metal forming and transportation. Better metal forming capabilities to minimize machining and grinding require lubrication techniques and lubricants that can be used effectively at temperatures approaching the melting points of the metals now employed. In transportation, one of the most productive areas for increasing energy efficiencies is often referred to as high temperature engines wherein temperatures range from 600° C. and above making the selection of lubricants and means of lubrication still difficult. A known technique for lubricating at such high temperatures is the use of solid lubricants in the form of plasma sprayed coatings of the metals and ceramics being employed. More recent developments whereby an adherent solid polymeric lubricating film is deposited on a ferrous metal surface to afford such protection are reported in technical publications entitled "In Situ Formation of Solid Lubricating Films from Conventional Mineral, Oil and Ester Solid Lubricants", authored by M. deGouvea Pinto, J. L. Duda, E.E. Graham and E.E. Klaus, ASLE proceedings, 3rd International Conference on Solid Lubrication, ASLESP-14 1984 and "Lubrication from the Vapor Phase at High Temperatures", authored by E.E. Graham and E.E. Klaus, ASLE transactions, volume 29, no. 2 pages 229-234 (1986). As described in said technical publications the metal surfaces are deemed to have a catalytic effect upon the vapor phase reactants whereby surface polymerization of said reactants takes place to produce the protective film. Possibly the absence of comparable metal catalytic agents in ceramic materials has prevented the formation of the protective film in such manner. More particularly, a vapor phase deposition of the same reactants under the same process conditions has thus far only produced non-adherent surface deposits affording no substantial protection to the underlying ceramic substrate.

Improved vapor phase lubrication of ceramic bearing devices with a more adherent organic polymer film is disclosed in a co-pending U.S. patent application Ser. No. 07/488,984 entitled "Ceramic Article Having Wear Resistant Coating", filed Mar. 5, 1990 in the names of E.E. Graham and J.F. Makki. Formation of a tenacious lubricating film is achieved upon treating the uncoated ceramic surface at elevated temperatures with activating metal ions to form a deposit of the activating metal ions on the ceramic surface and thereafter exposing the treated ceramic surface to a vaporized polymer-forming organic reactant at elevated temperatures whereby an adherent solid organic polymer lubricating film is produced on the treated surface. Bearing surfaces formed with crystalline ceramic materials such as silicon nitride and silicon carbide as well as vitreous ceramics such as fused quartz can be provided with a protective coating resistant to dynamic wear conditions up to at least 500° C. and higher in this manner. In one embodiment, activating metal ions comprising a transition metal element selected from the Periodic Table of Elements, to include iron and tin are initially deposited at temperatures of at least 300° C. on the ceramic surface. Formation of the lubricating film on the treated ceramic surface is achieved with vapor deposition again conducted at elevated temperatures of approximately 300° C.–800° C. of various polymer forming organic reactants such as petroleum hydrocarbon compounds, mineral oils, various synthetic lubricants, and to further include tricresyl phosphate (TCP) and triphenyl phosphate.

It remains desirable to provide an effective lubrication of ceramic bearing means when operated at these elevated temperatures under atmospheric conditions by still simpler means. Accordingly, it is one object of the present invention to provide a metal oxide lubrication system for various type mechanical apparatus utilizing ceramic bearing means under such operating conditions, to include gas turbine and aerospace vehicle engines.

It is another object of the present invention to provide means for continuous lubrication of ceramic bearing surfaces with solid metal oxide lubricants formed in situ.

A still further object of the present invention is to provide a novel method for the lubrication of ceramic bearing surfaces with solid metal oxide lubricants.

These and further objects of the present invention will become apparent upon considering the following detailed description of the present invention.

SUMMARY OF THE INVENTION

It has now been discovered that pretreatment of the ceramic bearing surfaces with activating metal ions in order to secure subsequent adherence of a lubricant is no longer essential for a novel class of lubricating agents. More particularly, a substantially continuous deposition of solid metal oxide products on the untreated ceramic bearing surfaces while being operated at elevated temperatures under atmospheric conditions now provides a surprisingly effective means of lubrication. Generally, the presently improved lubrication system requires an oxidizable metal source to be located in physical proximity to the ceramic bearing surfaces for conversion of the metal source to metal oxide products accompanied by transportation of the metal oxide products to the bearing surfaces. A representative lubrication system enabling such mode of operation comprises: (a) support means causing the ceramic bearing surfaces to be maintained in dynamic physical contact, (b) an oxidizable metal source located in physical proximity to the support means, and (c) heating means for continuously heating the metal source while the ceramic bearing surfaces are being operated sufficient to provide the solid metal oxide lubricants. In one embodiment, the ceramic bearing means employs ceramic ball bearings supported within a ceramic race and with a metal housing member enclosing the bearing structure. Utilizing oxidizable metals for construction of said housing member, including molybdenum and iron alloys, provides a suitable metal source in sufficient physical proximity to the bearing surfaces for satisfactory lubrication according to the present invention. Operation of said type lubrication system in air at temperatures in the approximate range 660° C. and above at bearing rotational speeds of 3200 RPM enabled continuous bearing operation for an eight hour test period with minimum bearing wear. Examination of the ceramic ball bearings after such test evaluation found oxide deposits of the particular metal being employed for the housing member adhering to the bearing surface.

Representative ceramics useful in the present lubrication system include both silicon nitride and silicon carbide. Both ceramics are crystalline materials with silicon carbide being a very hard material which is both corrosion and thermal resistant, is lighter than steel and exhibits a high thermal conductivity and low thermal expansion whereas silicon nitride is characterized by low thermal expansion, excellent corrosion resistant and high temperature stability. A relatively large class of metal-containing materials can be employed as the metal source in carrying out the present lubrication method. Solid metal and metal compounds undergoing oxidation at bearing operating temperatures of approximately 600° C. and above can provide a suitable metal source in various ways. Thus, locating one or more deposits of such metal source adjacent to the ceramic bearing surfaces will suffice. Heating energy being generated by physical contact between the moving bearing surfaces can cause a sufficient portion of the solid material to become oxidized while further causing the resultant metal oxide products to be deposited on the moving bearing surfaces. As also noted above, having some portion of the bearing construction itself, such as the housing member or cage, fabricated with a suitable solid metal source provides a different means to practice the present invention. In still further embodiments, oxidizable liquid and gaseous metal-containing materials are also expected to prove suitable. Introduction of such metal sources by already known conventional techniques possibly involving supplemental heating and the like should enable the desired conversion and transport of said materials for lubrication of the ceramic bearing surfaces to occur.

DETAILED DESCRIPTION OF THE PREFERRED EMBODIMENTS

Figure 1:
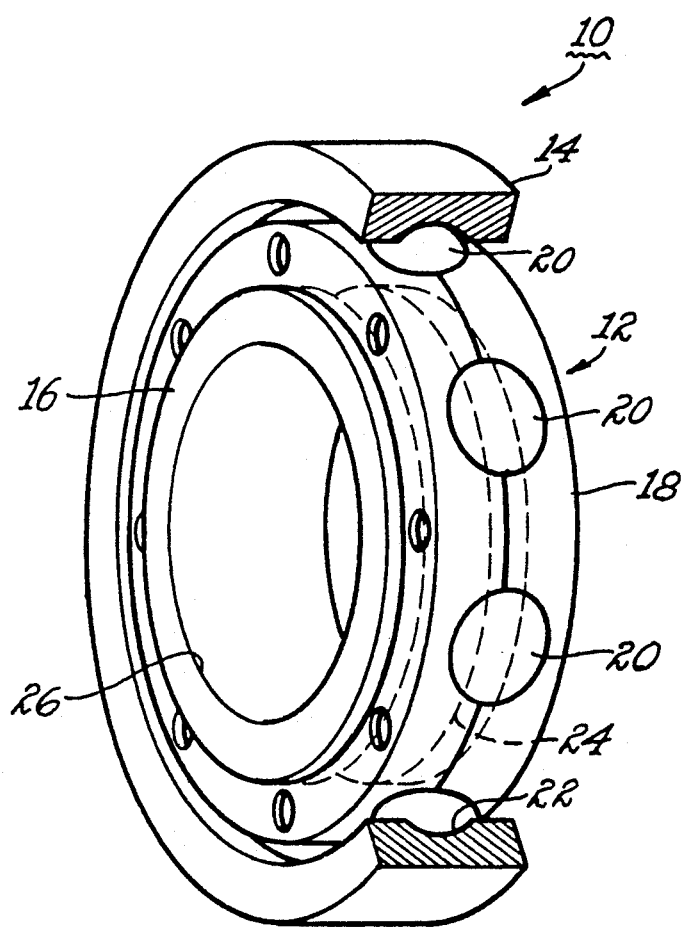
FIG. 1 is a perspective view depicting a representative ball bearing lubrication system according to the present invention.

Referring to the drawings, there is depicted in FIG. 1 representative ceramic bearing means having a lubrication system according to the present invention. More particularly, bearing means 10 is of a conventional ball-bearing construction 12 having an outer ceramic ring 14 which encloses a hollow ceramic ring 16 along with a metal ball-filled cage 18 being supported therebetween. Cage 18 is constructed with an oxidizable metal alloy such as TZM molybdenum alloy or #4340 chromium-nickel steel to enable bearing operation at very elevated temperatures of 600° C. and greater. Representative ceramics for fabrication of balls 20, as well as outer and inner rings 14 and 16, respectively, include both silicon nitride and silicon carbide. As further noted in the present drawing, radial grooves 22 and 24 are provided in said outer and inner ceramic rings 14 and 16, respectively, as the race path for the ball elements 20 sandwiched therebetween. Hollow inside diameter 26 provided in the inner ceramic ring 16 further permits mounting of the depicted bearing means on a rotatable shaft member (not shown) being employed in various air-operated mechanical apparatus often turning at operational shaft and bearing speeds reaching or exceeding 3200 RPM. When so operated, bearing contact forces between the ceramic ball elements and ceramic rings in dynamic physical contact therewith can exceed 744000 PSI. Such bearing means itself provides a sufficient heating source when operated under these conditions to cause a sufficient portion of the cage 18 to become oxidized and form a solid metal oxide lubricant for the engaged bearing surfaces.

Figure 2:
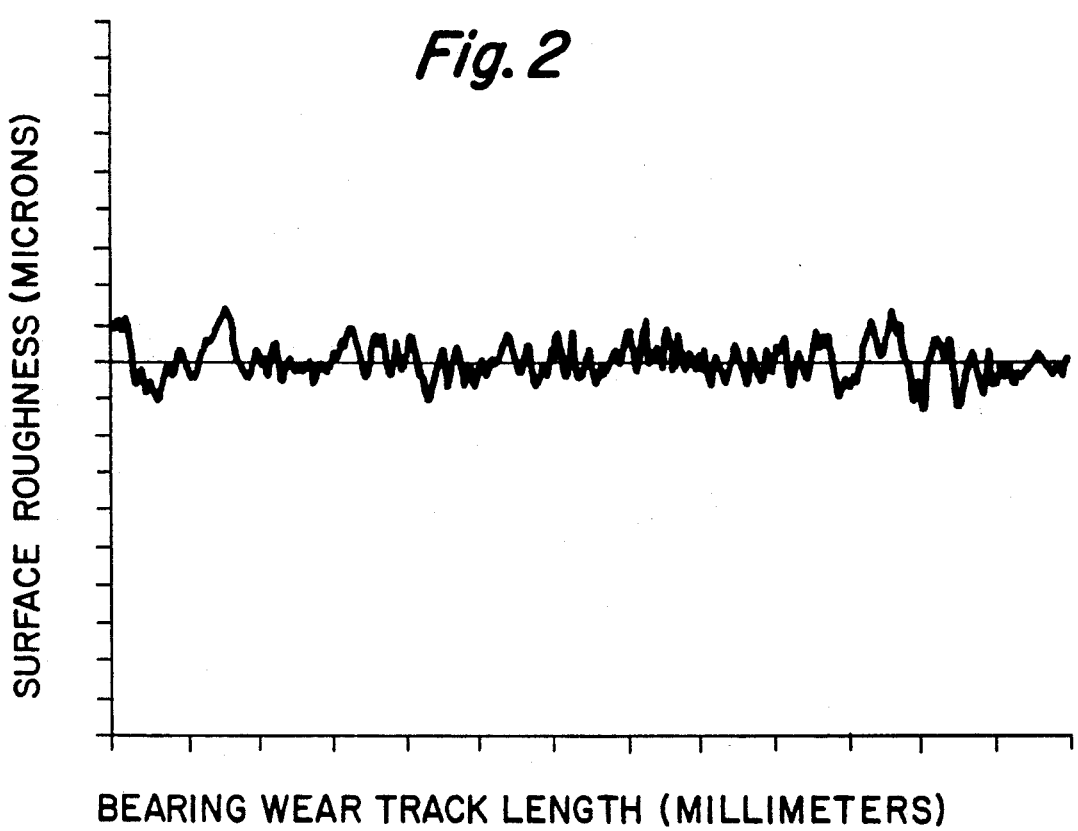
FIG. 2 is a graph demonstrating bearing wear for a particular lubrication means of the present invention.

Bearing wear was evaluated for a generally similar lubrication system to that above described having both TZM molybdenum alloy and #4340 steel being utilized for construction of the cage element. A known "ball and rod" test device was employed for such evaluation having a plurality of ⅛" diameter silicon nitride ball bearings being housed within the selected oxidizable metal cage while further being in dynamic physical contact with the periphery of a ⅜" diameter silicon nitride rod. The wear tests were conducted over various time periods at the operating conditions above mentioned for the preceding embodiment In FIG. 2, there is shown the amount of peripheral wear experienced with a TZM molybdenum alloy rod in the aforementioned test device. More particularly, the ordinate in the depicted linear graph represents the amount of surface wear at a particular location on the ceramic bearing wear track with each vertical graduation on the graph signifying 0.5 microns of bearing wear. The graph abcissa represents the bearing wear track length along the central axis of the bearing rod with each horizontal graduation on the graph signifying 0.2 millimeters of length along the wear track. Operation of said test unit for a one hour period at the above noted test conditions demonstrated that surface roughness of the bearing surface did not exceed ∓0.5 micron due to continuous lubrication being provided with oxidation of the molybdenum alloy.

Figure 3:
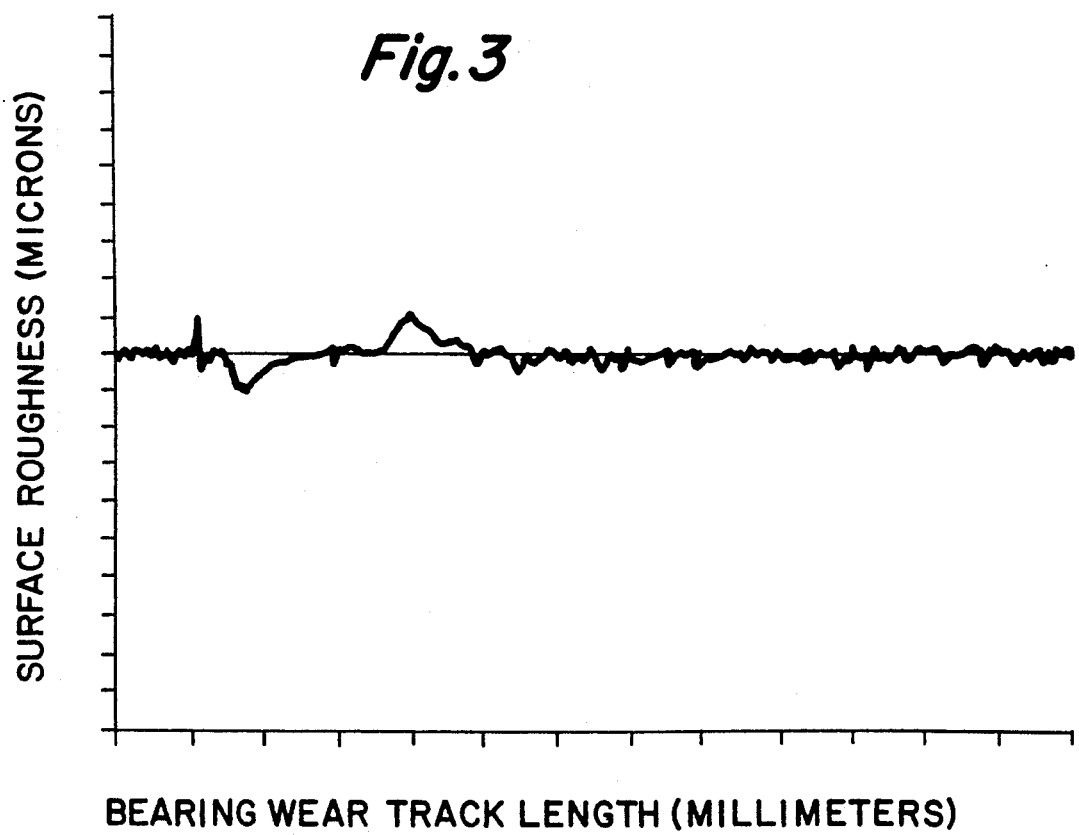
FIG. 3 is graph demonstrating bearing wear for different lubrication means of the present invention.

FIG. 3 demonstrates still less bearing wear incurred under the same test conditions when constructing the cage element with #4340 chromium nickel alloy steel. The depicted test measurements were made after operation of the test unit for approximately eighty minutes and indicates far less surface roughness along the overall length of the bearing track than was experienced in the preceding evaluation. It can be concluded therefrom that iron oxide deposits on the contacting bearing surfaces provide more effective lubrication under said test conditions than was provided with molybdenum oxide lubrication. Less favorable results were achieved, however, when said steel cage bearing embodiment was operated at approximately 538° C. for thirty minutes. Under the latter operating conditions, bearing wear along the track length reached a maximum of 200 microns.

It will be apparent from the foregoing description that broadly useful and novel means have been provided to continuously lubricate various type ceramic bearing surfaces when operated under atmospheric conditions at extremely elevated temperatures of about 600° C. and greater. It is contemplated that such improved lubrication can likewise be obtained with other bearing means such as above mentioned to include ceramic roller bearing devices as well as providing continuous lubrication of the ceramic bearing surfaces with an oxidizable metal source other than the specifically disclosed metal alloys. For example, continuous oxidation and transport of the solid metal oxide products formed to the bearing surfaces with the metal source being introduced as a liquid or gas to the operating bearing environment is also contemplated. Consequently, it is intended to limit the present invention only by the scope of the appended claims:

What I claim as new and desire to secure by Letters Patent of the United States is:

1. A lubrication system for a mechanical apparatus employing at least one pair of ceramic bearing surfaces being operated in dynamic physical contact at elevated temperatures under atmospheric conditions comprising in combination:
   (a) support means causing the ceramic bearing surfaces to be maintained in dynamic physical contact,
   (b) an oxidizable metal source located in physical proximity to the support means, and
   (c) heating means for continuously oxidizing the metal source while the ceramic bearing surfaces are being operated sufficient to form a solid metal oxide lubricant.

2. The lubrication system of claim 1 wherein the ceramic bearing surfaces include a plurality of ceramic ball bearings.

3. The lubrication system of claim 2 wherein the support means comprises a housing member having race means in which the ball bearings are supported.

4. The lubrication system of claim 2 wherein a vaporizable metal sources is contained within a housing member.

5. The lubrication system of claim 2 wherein the support means comprises a housing member formed with an oxidizable metal alloy.

6. The lubrication system of claim 1 wherein the mechanical apparatus is operated in air.

7. The lubrication system of claim 1 wherein the ceramic bearing surfaces are operated at elevated temperatures of at least 600° C.

8. The lubrication system of claim 1 wherein the ceramic bearing surfaces comprise silicon nitride.

9. The lubrication system of claim 1 wherein the ceramic bearing surfaces comprise silicon carbide.

10. The lubrication system of claim 1 wherein the metal oxide lubricant includes molybdenum oxide.

11. The lubrication system of claim 1 wherein the metal oxide lubricant includes iron oxide.

12. A method of reducing mechanical wear between a pair of ceramic bearing surfaces being operated in dynamic physical contact at elevated temperatures under atmospheric conditions which comprises:
   (a) providing an oxidizable metal source in physical proximity to the ceramic bearing surfaces,
   (b) causing the ceramic bearing surfaces to be operated in dynamic physical contact at elevated temperatures under atmospheric conditions,
   (c) continuously heating the metal source while the ceramic bearing surfaces are being operated under said conditions sufficient to form a solid metal oxide lubricant, and
   (d) depositing the metal oxide lubricant on the ceramic bearing surfaces.

13. The method of claim 12 wherein the ceramic bearing surfaces are operated in air.

14. The method of claim 12 wherein heating of the metal source is provided with heating energy being generated by physical contact between the moving bearing surfaces.

15. The method of claim 12 wherein the ceramic bearing surfaces are operated at temperatures of at least 600° C.

16. The method of claim 12 wherein the ceramic bearing surfaces comprise silicon nitride.

17. The method of claim 12 wherein the ceramic bearing surfaces comprise silicon carbide.

18. The method of claim 12 wherein the metal oxide lubricant includes molybdenum oxide.

19. The method of claim 12 wherein the metal oxide lubricant includes iron oxide.

* * * * *